United States Patent [19]

Fitzpatrick et al.

[11] Patent Number: 5,420,936
[45] Date of Patent: May 30, 1995

[54] METHOD AND APPARATUS FOR ACCESSING TOUCH SCREEN DESKTOP OBJECTS VIA FINGERPRINT RECOGNITION

[75] Inventors: Greg P. Fitzpatrick, Rochester, Minn.; Thomas R. Haynes, Euless; Marvin L. Williams, Lewisville, both of Tex.

[73] Assignee: International Business Machines Corporation, Armonk, N.Y.

[21] Appl. No.: 219,427

[22] Filed: Mar. 29, 1994

Related U.S. Application Data

[63] Continuation of Ser. No. 962,366, Oct. 16, 1992, abandoned.

[51] Int. Cl.$^6$ ............................ G06K 9/00; G06F 7/04
[52] U.S. Cl. ................................ 382/124; 340/825.31; 345/173
[58] Field of Search .................... 382/4, 5; 340/825.31, 340/825.34; 345/173-178; 380/3, 23, 25; 178/18, 19

[56] References Cited

U.S. PATENT DOCUMENTS

| | | | |
|---|---|---|---|
| 4,218,738 | 8/1980 | Matyas et al. | 364/200 |
| 4,246,568 | 1/1981 | Peterson | 340/146.3 E |
| 4,353,056 | 10/1982 | Tsikos | 340/146.3 E |
| 4,429,413 | 1/1984 | Edwards | 382/4 |
| 4,464,566 | 8/1984 | Silverman et al. | 235/382 |
| 4,526,043 | 7/1985 | Boie et al. | 73/862.046 |
| 4,563,716 | 1/1986 | Shultz | 360/92 |
| 4,582,985 | 4/1986 | Löfberg | 235/380 |
| 4,599,509 | 7/1986 | Silverman et al. | 235/382 |
| 4,641,350 | 2/1987 | Bunn | 382/4 |
| 4,691,355 | 9/1987 | Wirstrom et al. | 380/23 |
| 4,694,492 | 9/1987 | Wirstrom et al. | 380/23 |
| 4,731,841 | 3/1988 | Rosen et al. | 380/23 |
| 4,805,223 | 2/1989 | Denyer | 382/4 |
| 4,817,183 | 3/1989 | Sparrow | 382/4 |
| 4,952,932 | 8/1990 | Sugino et al. | 345/173 |
| 5,157,384 | 10/1992 | Greanias et al. | 340/706 |
| 5,202,929 | 4/1993 | Lemelson | 382/2 |

OTHER PUBLICATIONS

Gungl "Computer Interface and Touch Sensitive Screens" Proc. VLSI and Computer Peripherals, pp. 2/98-100, May 1989.

Kobayashi "A Fingerprint Image Recognition Method for Network User Identification" Proc. 4th Int. Conf. Comput. and Info. May 1992, pp. 369-372.

Broockman, E. C., et al. "LCD Panel/Filter Image Recognition System" IBM Technical Disclosure Bulletin, Mar. 1987, pp. 4544-4547.

Riskin, S. I. "Fingerprint Comparator" IBM Technical Disclosure Bulletin, Nov. 1975, pp. 2018-2020.

Gaffney, J. E. "Encoded Fingerprint File Indexing Method" IBM Technical Disclosure Bulletin, Aug. 1974, pp. 775-776.

Gaffney, J. E. "Fingerprint Pattern Offset Determination and Matching Method" IBM Technical Disclosure Bulletin, Aug. 1974, pp. 773-774.

Ting, Y. M. "Detection of the Core and Delta of Fingerprints" IBM Technical Disclosure Bulletin, Jul. 1974, pp. 406-407.

Follette, D. T. et al. "Direct Optical Input System for Fingerprint Verification" IBM Technical Disclosure Bulletin, Apr. 1974, p. 3572.

(List continued on next page.)

Primary Examiner—Yon J. Couso
Assistant Examiner—Jon Chang
Attorney, Agent, or Firm—A. Bruce Clay

[57] ABSTRACT

A method of manipulating and obtaining access to graphical desktop objects is disclosed. Touch-sensitive fields are provided on a computer display for user selection. Upon selecting one of the fields with a fingertip, a fingerprint therefrom is analyzed and compared to a list of authorized fingerprints. Once the fingerprint passes inspection, the user is granted access to the underlying program.

6 Claims, 4 Drawing Sheets

OTHER PUBLICATIONS

Ting, Y. M. et al. "Fingerprint Image Enhancement System" IBM Technical Disclosure Bulletin, Jan. 1974, pp. 2688–2690.

Ting, Y. M. et al. "Fingerprint Image Enhancement System" IBM Technical Disclosure Bulletin, Jan. 1974, pp. 2684–2685.

Rackt, W. K. "Dynamic Threshold Circuit" IBM Technical Disclosure Bulletin, Sep. 1972, pp. 1138–1139.

Schuenzel, E. C. et al. "Credit Card System" IBM Technical Disclosure Bulletin, Jun. 1970, pp. 176–177.

Stroud, R. E. "Optical Digitizing of Fingerprints" IBM Technical Disclosure Bulletin, Jun. 1970, p. 116.

Guidi, P. V. et al. "Scan Patterns for Bifurcation Location and Direction Detection" IBM Technical Disclosure Bulletin, Feb. 1967, pp. 1162–1164.

Gaffney, J. E. "Pattern Orientation Scheme" IBM Technical Disclosure Bulletin, Nov. 1966, p. 633.

Malek, K. "Fingerprint Classification and Identification" IBM Technical Disclosure Bulletin, May 1966, p. 1789.

Levine. W. J. et al. "Detecting Ridge Slope and the Core of a Fingerprint" IBM Technical Disclosure Bulletin, May 1966, pp. 1787–1788.

Smith, D. J. "Optical Fingerprinting" IBM Technical Disclosure Bulletin, Jun. 1965, p. 137.

METHOD AND APPARATUS FOR ACCESSING TOUCH SCREEN DESKTOP OBJECTS VIA FINGERPRINT RECOGNITION

The application is a continuation of application Ser. No. 07/962,366, filed Oct. 16, 1992, now abandoned.

TECHNICAL FIELD OF THE INVENTION

This invention relates in general to graphical user interfaces, and in particular to the use of fingerprint recognition with touch screens to manipulate graphical desktop objects and to access the underlying data.

BACKGROUND OF THE INVENTION

Modern computer systems are becoming more user-friendly through the use of graphical user interfaces. Such interfaces provide a more intuitive method for an operator to use the programs thereon. For example, an operator may invoke a program by the selection of a graphical object or icon rather than by typing in a program command. Thus, the operator does not need to remember program commands which are frequently non-intuitive and are generally considered unfriendly.

As computers are more and more widely accepted, more information, including sensitive or classified information, is placed on computers. As is well known, there are many people who pride themselves in the ability to "break" into computer systems to access data. There are many different ways to attempt to prevent unauthorized personnel from obtaining data on a computer. Passwords are commonly used for such a purpose. For example, an operator is required to type in a predetermined code word or sequence of keystrokes before access is granted. If the password is approved, the operator is then allowed to obtain the data and/or run programs as desired. Unfortunately, as noted above, there are many personnel who pride themselves in being able to break code words or passwords and obtain unauthorized entry into computer systems.

In addition to the use of passwords, other entry authorization techniques include the use of identification cards (U.S. Pat. No. 4,599,509, Jul. 8, 1986, to Silverman, et al.) and encryption devices (U.S. Pat. No. 4,691,355, Sep. 1, 1987, to Wirstrom, et al.).

Whenever a plurality of personnel have access to a single input device, there is a possibility that unauthorized access may be allowed. For example, an operator will typically initialize the terminal at the beginning of the day and sign on with the appropriate password. Thus, access will be granted to any programs to which that operator is allowed by anyone who would use that terminal. If the operator is absent from the terminal, any person authorized or unauthorized would be able to obtain data therefrom. Thus, there is a need for a method and apparatus which will allow a computer system to grant access to individual files/programs on an as-authorized basis only.

Further in the desire to create a more user-friendly system, touch screen technology enables direct object selection by a user's fingers contacting a touch screen surface directly over a graphical object. In addition, there are known devices which can compare a live fingerprint against a referenced print. Thus, while there are fingerprint recognition devices, there is no presently known method and apparatus allowing access to computer systems and individual programs thereon by fingerprint recognition on touch screens.

SUMMARY OF THE INVENTION

The present invention provides a method and apparatus for obtaining access to a computer system which eliminates or substantially reduces the problems of the prior art. The present invention allows a computer system, with multiple operators through single input devices, to grant access to individual files/programs on an as-authorized basis only.

In accordance with one aspect of the present invention, a method of obtaining access to a computer system is provided. A recognition device is linked to the system. Access to the system is then based upon an acceptable response provided by a user to the recognition device.

In one embodiment, the recognition device comprises a fingerprint recognition device. By touching a screen directly over a graphical object, a user may be granted access to the program identified thereby only if there is a match with a file of authorized prints. If no match occurs, access to that program is denied. Thus, multiple users of a single terminal can obtain information only from programs to which they are authorized access.

It is a technical advantage of the present invention in that multiple users of a single terminal will be allowed to access only the data they are authorized. It is a further technical advantage of the present invention that access can be granted to multiple levels of information, if authorized, without the need for multiple passwords.

BRIEF DESCRIPTION OF THE DRAWINGS

For a more complete understanding of the present invention and the advantages thereof, reference is now made to the Detailed Description taken in conjunction with the attached Drawings, in which.

DETAILED DESCRIPTION OF THE INVENTION

Figure 1:
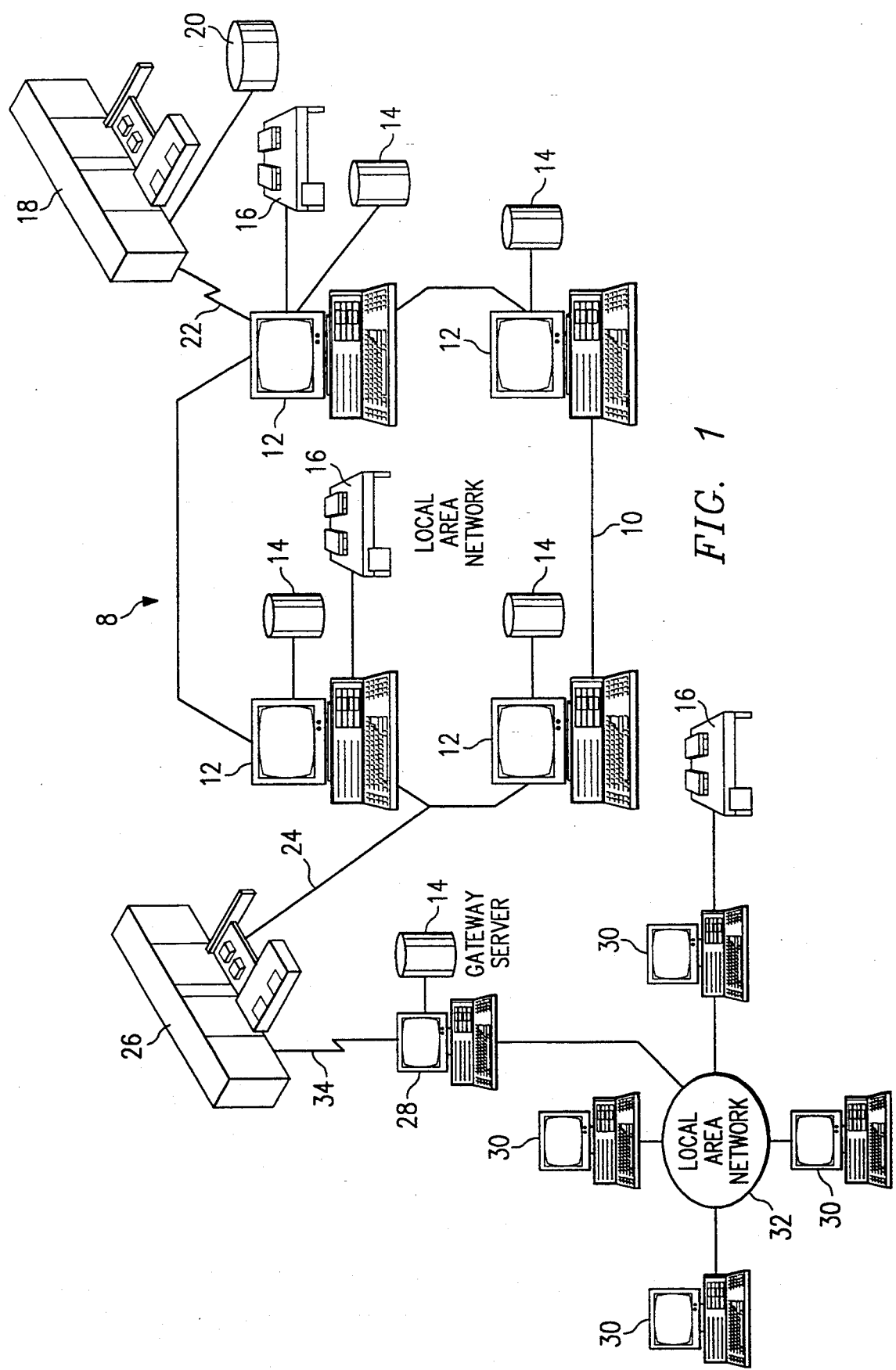
FIG. 1 is a graphical representation of a data processing system in accordance with the present invention.

Referring first to FIG. 1, there is depicted a graphical representation of a data processing system 8 which may be utilized to implement the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Workstations (IWS) coupled to a host processor may be utilized for each such network. As is common in such data processing systems, each individual computer may be coupled to a storage device 14 and/or a printer/output device 16.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a subsystem control unit/communications controller 26 and communications link 34 to a gateway server 28. Gateway server 28 is preferably an individual computer or IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California while LAN 10 may be located within Texas and mainframe computer 18 may be located in New York.

Figure 2:
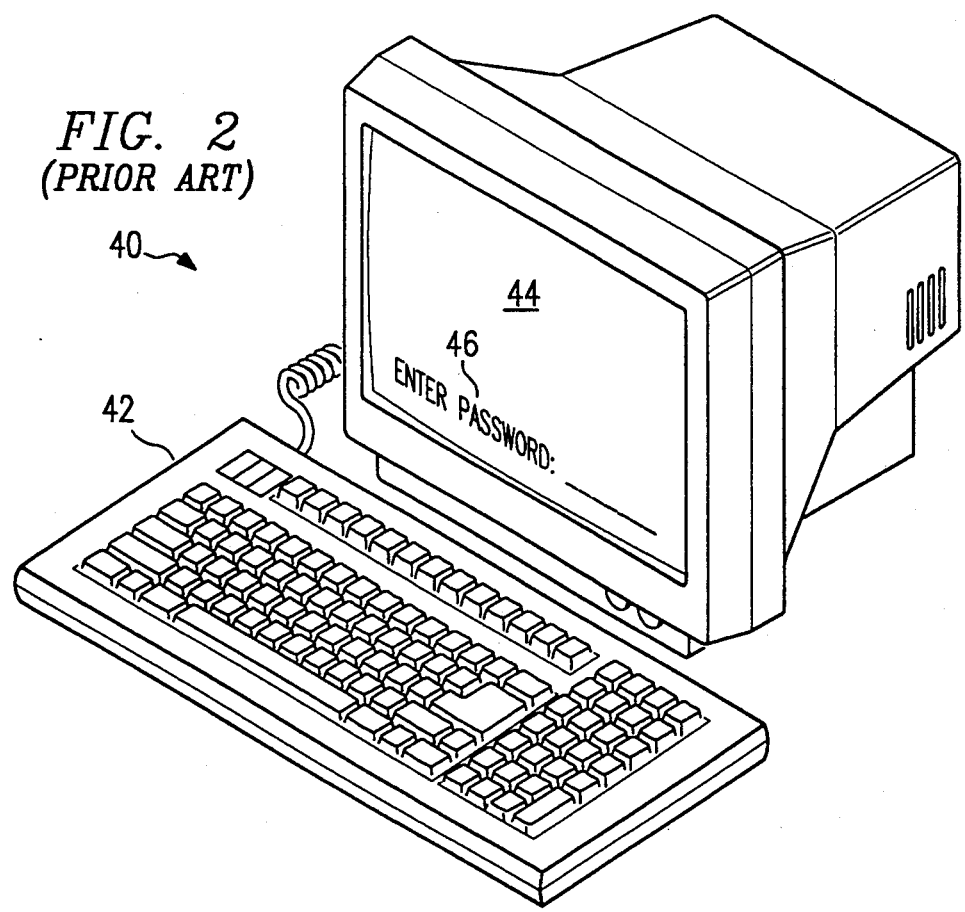
FIG. 2 illustrates a password entry to gain access to a computer system in accordance with the prior art.

Referring next to FIG. 2, a monitor 40 and keyboard 42 such as found with individual computers 12 and 30 (see FIG. 1) are illustrated. As shown on screen 44 of the monitor 40, a required "Enter Password" as indicated by reference numeral 46 is displayed. In order to gain access to the data accessible through the monitor 40, an operator must type, using keyboard 42, the authorized password in the space provided on the screen 44. As used herein, an "operator" is defined as a person who uses a computer program installed on a computer system. The term "user" may be used interchangeably herein to mean the same as an "operator". Once the proper password is typed, entered and accepted, the operator typically has access to any information available thereby. Thus, if the operator leaves the monitor 40 unattended without appropriately securing same, an unauthorized person may obtain access to data therethrough.

Figure 3:
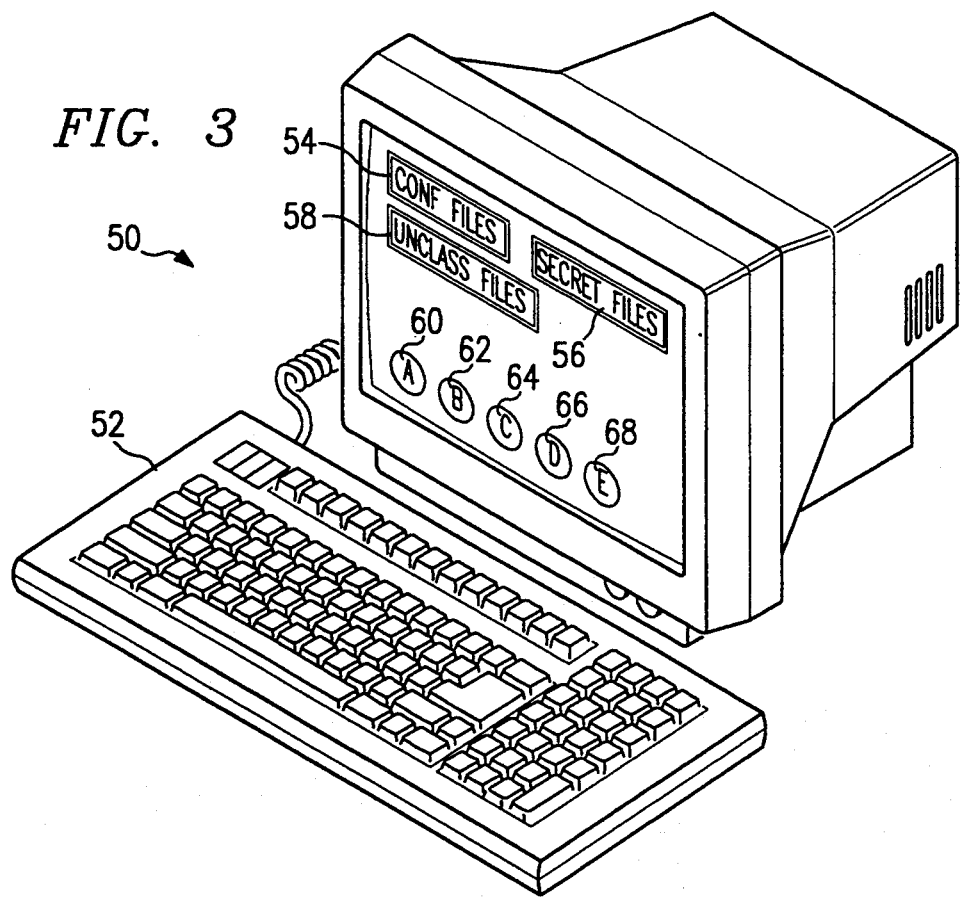
FIG. 3 illustrates an embodiment of the present invention.

Referring to FIG. 3, a monitor 50 and keyboard 52 such as are used with the individual computers 12 and 30 (see FIG. 1) are illustrated. In contrast with the prior art, the present invention does not provide access to all data available through the monitor 50 just by entering a single (or even multiple levels) of code words. Once the computer system to which the monitor 50 and 52 has been activated, touch screen fields (which may include text or graphics) are presented to the operator. For example, a touch screen field 54 is provided for access to confidential files, a touch screen field 56 is provided for access to secret files and a touch screen field 58 is provided for access to unclassified files. In addition, touch screen fields 60, 62, 64, 66 and 68 may be provided for access to programs/data A, B, C, D and E, respectively. In order to gain access to any of the data or programs indicated by one of the touch screen fields 54, 56, 58, 60, 62, 64, 66 or 68 an operator must place their fingertip thereon. At that point, a fingerprint recognition device interconnected to the monitor 50 will check for authorized access. If the operator is authorized access to that data/program, the data/program will be presented to the operator. Any single operator may be authorized access to one or more of the programs/files presented on the monitor 50. Similarly, all operators in a department/group may access data/programs through the monitor 50 only if they are authorized for the specific information they are attempting to gain access to. By using the present invention, the unattended monitor 50 has a reduced likelihood of being used to compromise data by personnel not authorized access thereto. Also, use of a time delay may keep unattended access to a specific program (already opened) to a minimum.

Figure 4:
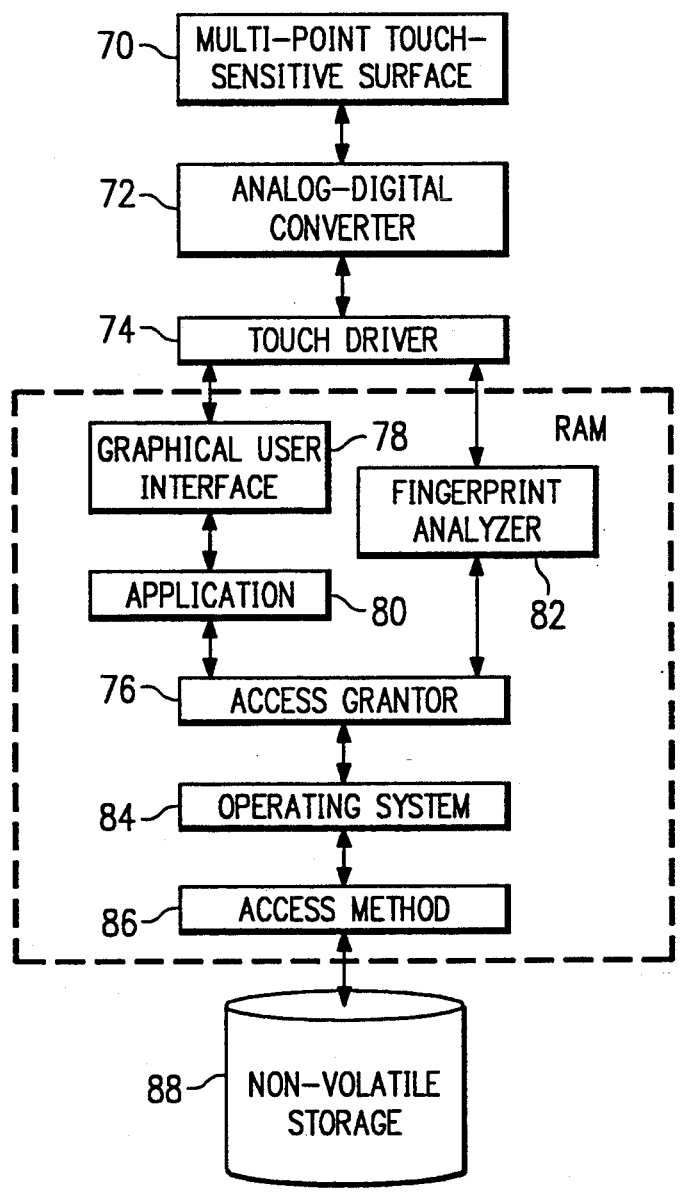
FIG. 4 is a diagram illustrating the interrelationship of the various components used in conjunction with the present invention.

Referring to FIG. 4, a graphical illustration of the interrelationship of components necessary to utilize the present invention is illustrated. A multi-point, touch-sensitive surface 70 which detects contact at given points is provided with the monitor 50 (see FIG. 3). An analog-digital converter 72 to pass data about contacts is positioned between the touch-sensitive surface 70 and a touch driver 74. From the touch driver 74, a dual path is taken to an access grantor 76. In a first path, a graphical user interface 78 indicates which icon has been selected. Information about the selected icon is then passed to an application 80 for processing. In a second path, the touch driver 74 communicates with a fingerprint analyzer 82. A fingerprint image is communicated to the analyzer 82 in a form appropriate to distinguish a unique fingerprint, as is known in the art. Once an operator touches a field or an icon, a fingerprint template is compared to an associated "per-icon" access table found in the access grantor 76. Upon the templates meeting a specified confidence level, manipulation access is granted through an operating system 84 and access method 86. The appropriate program/data is then obtained from nonvolatile storage 88 which allows the operator to proceed.

Figure 5:
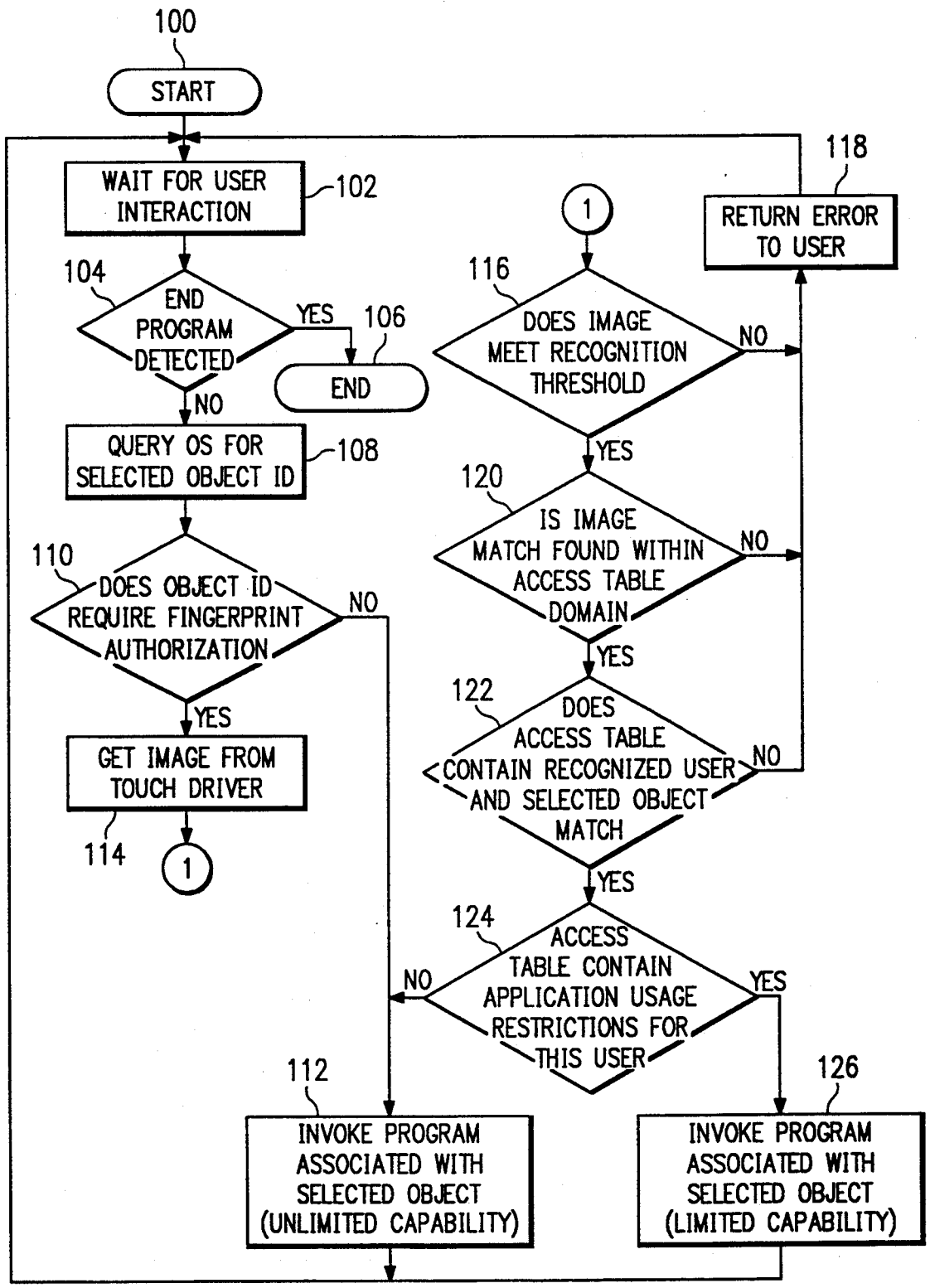
FIG. 5 is a flowchart of the present invention.

Referring to FIG. 5, a flowchart illustrating the present invention is provided. The present invention starts at 100 and waits for user interaction at block 102. At decision block 104 it is determined whether or not an "End Program" is detected. If the response to decision block 104 is yes, the present invention ends at 106. If the response to decision block 104 is no, the operating system is queried for selected object identification at block 108.

At decision block 110 it is then determined whether or not the object ID requires fingerprint authentication or not. If the response to decision block 110 is no, the program associated with the selected object is invoked at block 112 which is an unlimited capability followed by a return to block 102 to wait for user interaction. If the response to decision block 110 is yes, an image is obtained from the touch driver at block 114.

At decision block 116 it is determined whether or not the image meets the recognition threshold. If the response to decision block 116 is no, an error message is returned to the user at block 118 followed by a return to block 102. If the response to decision block 116 is yes, it is determined at decision block 120 whether or not an image match is found within the access table domain. If the response to decision block 120 is no, an error message is returned to the user at block 118 followed by a return to block 102. If the response to decision block 120 is yes, it is determined at decision block 122 whether or not the access table contains a recognized user and selected object match. If the response to decision block 122 is no, an error message is returned to the user at block 118 followed by return to block 102. If the response to decision block 122 is yes, it is determined at decision block 124 whether or not the access table contains application usage restrictions for this user. If response to decision block 124 is yes, programs associated with the selected object (a limited capability) are invoked at block 126 followed by a return to block 102. If the response to decision block 124 is no, the program associated with the selected object is invoked at decision block 112 followed by a return to block 102.

As a result of the present invention, security of a terminal and the programs accessed thereby is greatly enhanced. To access data available through the terminal, a user must be authorized access and must in fact be the authorized user as evidenced by a fingerprint. Once a terminal is initiated, a user may leave the terminal unattended with reduced fear of unauthorized access to sensitive information. Even if the user leaves the terminal with a sensitive program running thereon, an unauthorized user would be unable to access other data. By including a timer, unattended access by unauthorized personnel will be cut even further.

Although the present invention has been particularly shown and described with reference to a preferred embodiment, it will be understood by those skilled in the art that various changes in the form and detail may be made without departing from the spirit and the scope of the invention.

What I claim Is:

1. A method of manipulating data availability on a data processing system in order to allow general availability of the data processing system to a plurality of authorized users while allowing access to specific data thereon only to predetermined members of a subset of the authorized users, the subset being less than the whole of the authorized users, comprising the steps of:

storing in an access table on the data processing system a representation of a master fingerprint of each of the authorized users, said representation matched to a list of what specific data to which each of the authorized users are to be granted access;

one of the authorized users selecting a touch screen field, said field representing at least one portion of said specific data and said field being displayed on a monitor interconnected to the data processing system, by touching said field with a finger of said one of the authorized users;

obtaining a current fingerprint from said one user's finger on said touch screen field during said step of selecting a touch screen field;

comparing said current fingerprint with each said representation in said access table; and granting access to said at least one portion of said specific data if said one user's current fingerprint from said step of obtaining matches with one said representation in said access table and if said at least one portion of said specific data is on said list for said one of the authorized users.

2. The method of claim 1, wherein said step of selecting a field comprises:
selecting a graphical object.

3. The method of claim 1, wherein said step of selecting a field comprises:
selecting a textual field.

4. A system for manipulating data availability on a data processing system in order to allow general availability of the data processing system to a plurality of authorized users while allowing access to specific items of data thereon only to predetermined members of a subset of the authorized users, the subset being less than the whole of the authorized users, comprising:

means for storing in an access table on the data processing system a representation of a master fingerprint of each of the authorized users, said representation matched to a list of what specific data to which each of the authorized users are to be granted access;

means for allowing one of the authorized users to select a touch screen field, said field representing at least one portion of said specific data and said field being displayed on a monitor interconnected to the data processing system, by touching said field with a finger of said one of the authorized users;

means for obtaining a current fingerprint from said one user's finger on said touch screen field while selecting said touch screen field;

means for comparing said current fingerprint with each said representation in said access table; and means for granting access to said at least one portion of said specific data if said one user's current fingerprint, obtained while selecting said touch screen field, matches with one said representation in said access table and if said at least one portion of said specific data is on said list for said one of the authorized users.

5. The system of claim 4, wherein said means for allowing one of the authorized users to select a touch screen field comprises:
means for allowing one of the authorized users to select a graphical object.

6. The system of claim 4, wherein said means for allowing one of the authorized users to select a touch screen field comprises:
means for allowing one of the authorized users to select a textual field.

* * * * *